Jan. 1, 1935.  R. J. ELSOME-JONES  1,986,582
DRY RECTIFIER FOR ALTERNATING CURRENT
Filed Sept. 9, 1932
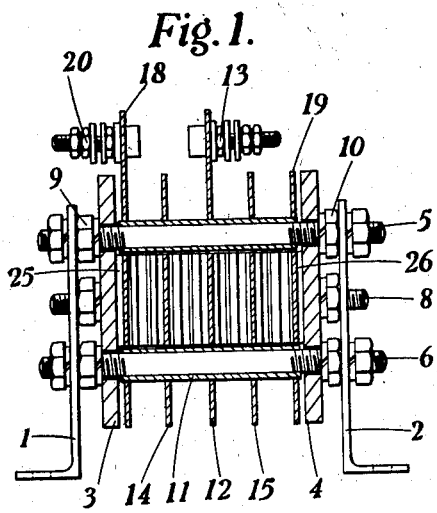
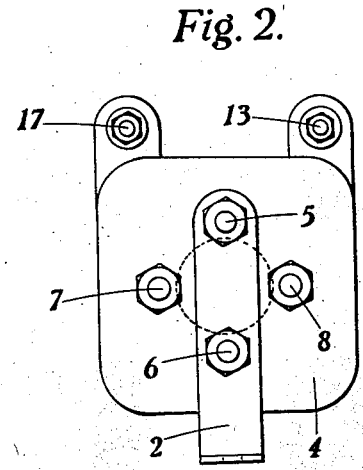
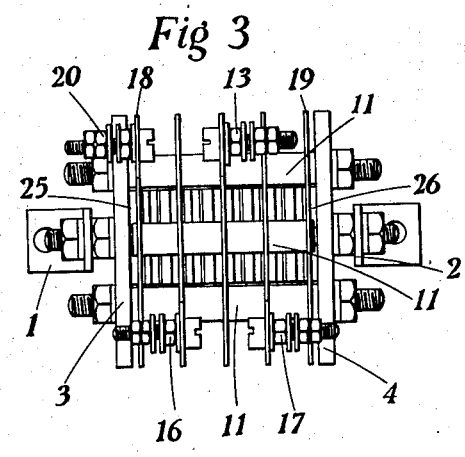
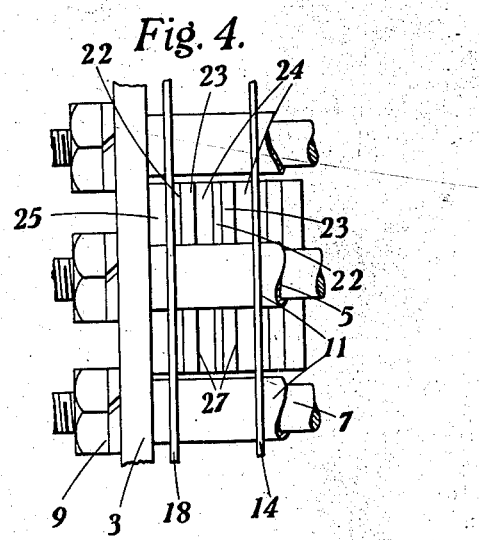
INVENTOR
R.J. ELSOME-JONES
BY
H.S. Sharpe
ATTORNEY Patented Jan. 1, 1935

1,986,582

UNITED STATES PATENT OFFICE 1,986,582

DRY RECTIFIER FOR ALTERNATING CURRENT

Ronald Job Elsome-Jones, Golders Green, London, England, assignor to International Standard Electric Corporation, New York, N. Y., a corporation of Delaware Application September 9, 1932, Serial No. 632,374
In Great Britain September 10, 1931

4 Claims. (Cl. 175—366)

This invention relates to dry surface rectifiers for alternating electric currents.

It has been found that the useful life of asymmetric couples hitherto proposed as rectifiers has been considerably shortened by reason of the destructive electro-chemical action occurring between the electrodes of the couple.

The present invention has for its main object to prevent such destructive electro-chemical action at the juxtaposed faces of the electrodes and thereby provide a rectifier having uniform rectifying characteristics over a considerably prolonged period of utility.

The invention also has for its object to provide a dry surface rectifier which may be cheaply manufactured and which will have substantially unidirectional current conducting properties so as to give a minimum alternating current leakage and a small direct current resistance, while being sufficiently robust to withstand heavy overload.

In accordance with the invention, a dry surface rectifier for alternating electric currents comprises an asymmetric couple with an intermediate relatively inert layer of metallic derivative physically separating the juxtaposed faces of the electrodes of the couple.

The intermediate layer is composed of derivatives which are normally non-conducting and is conveniently of a thickness, e. g. .005 inch, such that no appreciable potential drop occurs between the active electrode faces during rectification, preferably being an oxygen compound of one or more of the metals generally termed "electron emitting" inert to the materials of the electrodes in the couple, as it has been found that with such compounds higher current densities are obtained with consequent benefit to the rectification and electrical efficiencies of the couple.

The "electron emitting" metals are preferably such as are not normally radio-active but such as have increased or enhanced electron emitting properties under raised temperature.

Electron emitting metals found suitable are barium, thorium and uranium, preferably in the form of oxides, although sustained rectification may be obtained with a layer formed from other metallic substances, e. g. the oxides of lithium or cobalt.

Any appropriate materials may be employed for the electrode elements of the couple, although advantageously one consists of an alloy of magnesium and aluminium with which has been incorporated a small proportion of manganese to produce a workable alloy, and, as far as is possible, to prevent self-oxidization, and the other is a paste composition including copper sulphide.

Other materials, such as brass, lead, alloys of lead and tin, nickel and nickel-plated brass, may compose the first mentioned electrode but do not compare favourably in asymmetric conducting properties with the preferred aluminum alloy when assembled in the couple.

The composition preferred for the second mentioned electrode is a paste including sulphur, selenium, manganese sulphide, antimony sulphide and copper sulphide, which may be carried by a brass plate although such a plate or a plate of copper or lead alloy may be faced with a paste of compressed cupric sulphide or cuprous iodide and still provide substantial asymmetric current conducting properties when associated with the other specified elements of the couple.

The intermediate relatively inert metallic derivative is conveniently applied to the active face of the alloy electrode in the form of a paint, for instance where the layer is compounded from barium or thorium the face of the electrode may be coated with a nitrate solution and is afterwards subjected to heat, whereby the nitrate content is evaporated and the desired oxide layer remains. Preferably care should be taken in the application of the aforesaid non-conducting layer to prevent chemical action taking place on the surface of the electrode.

In the case of uranium, the layer is more conveniently applied in the form of an acetate, evaporation resulting in the transformation of this layer into the oxide layer required to physically separate the adjacent faces of the electrodes.

The elements of the couple or of a series of assembled couples are united under a pressure adequate to maintain intimate contact between the adjacent faces but not under excessive pressure which might mitigate the advantages accruing from the provision of the intermediate non-conducting layer.

A rectifier according to the invention is illustrated by way of example in the accompanying drawing, wherein:—

Fig. 1 is a longitudinal section, Fig. 2 an end elevation, Fig. 3 a plan view and Fig. 4 an enlarged detail view showing the manner in which the couples of the rectifier are assembled between the cooling fins.

The embodiment selected for illustration includes an assembly of eight couples and is arranged for full wave rectification, although it will be understood that where higher outputs are required a larger number of couples may be assembled to provide a rectifier and the assembly may be such as to provide for only half-wave rectification.

Referring now to the drawing, the rectifier is supported by a pair of standards 1 and 2 located at each end thereof exteriorly of end plates 3 and 4 between which the couples are assembled, the end plates 3 and 4 being of general rectangular form as shown more clearly in Fig. 2.

Between the end plates 3 and 4 extend a series of four bolts, extensions on two of which numbered 5 and 6, mount the standards 1 and 2 and are located in a vertical plane. The other two bolts are numbered 7 and 8 and are located in a transverse plane, the four bolts being disposed symmetrically about the end plates 3 and 4 and leaving an interior space sufficient for the accommodation of the couples.

The apertures in the end plate 3 receiving the four bolts are tapped and the bolts are secured thereto by lock nuts indicated at 9, while the end plate 4 is apertured to slide along the four bolts and is provided with adjusting nuts 10 hereafter referred to.

Between the end plates 3 and 4 each of the tie bolts 5, 6, 7 and 8 is provided with a tube or sleeve 11 of insulating material, the tie bolts being employed to locate the couples of the rectifier and the provision being accordingly necessary to prevent short-circuiting between adjacent couples or adjacent elements of the couples.

It will be noted that the rectifier construction illustrated does not employ a central tie bolt and accordingly imperforate electrodes may be employed with consequent advantage in the rectification efficiency and output of the individual couples, uniform surface contact being attained by clamping means comprising the four tie bolts 5, 6, 7 and 8 disposed peripherically about the assembled couples.

The couples are assembled in pairs between cooling fins, of which there are five in the eight couple rectifier illustrated, the central fin, designated 12, carrying a terminal 13 which is a D. C. positive output terminal.

The intermediate fins, designated 14 and 15, mount terminals 16 and 17, respectively, to which the A. C. input leads are connected, while the end fins 18 and 19 are permanently negative and connected to the frame, the D. C. negative terminal being shown mounted on the end fin 18 at 20.

The couples are disposed symmetrically about the central fin 12, a pair of couples being disposed between adjacent fins 22 indicating the brass plates or discs to which the paste is pressed or sealed, 23 the paste electrodes and 24 the alloy electrodes, see Fig. 4.

25 and 26 are spacing washers interposed between the end plates 3 and 4 and the respective end fins 18 and 19 and having for their object to ensure, so far as is practicable, a uniform application of pressure over the whole surface of each individual electrode, the eight couples, with their cooling fins 12, 14, 15, 18 and 19, being assembled on the end plate 3 in the space between the four tie bolts before the end plate 4 is positioned and adjusted to apply the necessary pressure to the couples by means of the adjusting nuts 10.

The radiating portions of the cooling fins are apertured or notched to pass the insulating sleeves 11 of the four tie bolts, and as appears more clearly from Fig. 2 the terminals are located in upwardly projecting extensions of the fins for the more convenient attachment of the leads.

Adjustment of the pressure to which the couples are subjected is simply effected by means of the adjusting nuts 10, although it will be understood that if desired a single nut adjustment could be provided by bridging the four bolts 5, 6, 7 and 8 and providing a central screw-threaded stud in said bridge engaging the end plate 4, rotation of the stud then adjusting the position of such end plate to vary the pressure applied to the assembled couples.

The illustrations represented in Figs. 1, 2 and 3 are approximately full size, the alloy electrodes 24 being imperforate discs say of ¾ inch diameter and constituted for example of the aluminium magnesium alloy described in British specification No. 360,960, the paste electrodes 23 being a compressed paste also conveniently constituted in accordance with the aforementioned specification and sealed to the brass plates 22 which are of similar peripheral dimensions to the alloy electrode discs but of a thickness of say $\frac{1}{32}$ inch.

The eight couple assembly illustrated gives a useful output capacity of about 6 watts on a supply not exceeding 10 volts, and where a greater output is required a plurality of rectifiers similar to that shown may be assembled in parallel, while for higher input voltages a rectifier utilizing a greater number of couples is preferred in order to prevent undue and deleterious heat production as the result of rectification.

The intermediate layers represented by the lines 27 may be a paint including any of the electron emitting substances aforementioned applied to the electrode surface in a volatile solution afterwards driven off by heating, thereby leaving the layers as a deposit on the active electrode surface, and it will be noted that whereas the substances employed for the intermediate layer are normally non-conducting, when interposed between the elements of the couple according to the invention they present substantially asymmetric conducting properties permitting the current to pass in one direction and substantially eliminating any inverse current. In this respect it may be stated that within limits the thickness of the layer is not critical, efficient rectification having been obtained with layers up to .1 inch in thickness, although to meet the desired conditions of eliminating as far as possible any appreciable potential drop between the active faces of the couples, layers approximating 1/64 inch in thickness are preferred, and when formed of the substances mentioned maintain their characteristics under the heat of rectification and prevent any destructive electro-chemical action between the juxtaposed faces of the individual electrode couples.

In the practice of the invention it may be found desirable, with the object of reducing as far as possible the potential drop across the individual paste electrodes, to make them of minimum thickness and, conveniently, pastes constituted as aforementioned may be applied as a paint or emulsion to a supporting disc formed from a good conductor, for instance an alloy of lead and tin, it having been found that the paint satisfactorily adheres to such alloy. The surface of the discs may be roughened or etched to ensure that adherence of the paste.

The paste may be thinned or emulsified with water or some volatile liquid, such as alcohol, prior to application, and a plurality of coats may be given to the aforementioned supporting disc in order that a uniform covering may be assured, the thinner or emulsifier being evaporated off after each coat.

With such an arrangement owing to the increased resilience and mechanical strength of the paste electrodes, the brass plates 22 might be omitted, although, owing to their good heat conducting capacity their retention is preferred and affords rapid dissemination of the heat produced by rectification.

The modified paste electrodes are assembled in the couples as previously described, preferably after a preliminary treatment with their coacting alloys electrodes in a press to level and obtain continuous contact between the co-operating adjacent faces.

Such preliminary treatment should be effected while the couple is subjected to current, the pressure being released after a standard output has been obtained, such output serving as an indication that the whole of the juxtaposed surfaces are in intimate effective contact.

An advantage resulting from constructions of dry surface rectifiers according to the invention lies in the fact that rectification occurs immediately the assembled couples are subjected to initial current and further the electrical efficiency, so far as can be ascertained, is substantially unimpaired by variations in operating temperature.

What is claimed is:

1. An alternating current rectifier comprising an electrode containing a metallic alloy, a second electrode containing a metallic sulphide and a layer of a compound of a metal generally termed electron emitting between said electrodes.

2. An alternating current rectifier comprising a metallic electrode, a paste electrode and an oxide of an electron emitting metal between said electrodes.

3. An alternating current rectifier comprising an electrode containing an aluminum alloy, a second electrode containing a copper sulphide and a layer of barium oxide between said electrodes.

4. An alternating current rectifier comprising an aluminum alloy electrode, an electrode containing a paste of sulphur, selenium, manganese sulphide, antimony sulphide and copper sulphide and a layer of a compound of an electron emitting metal between said electrodes.

RONALD JOB ELSOME-JONES.